United States Patent
Kasama

(10) Patent No.: US 7,761,883 B2
(45) Date of Patent: Jul. 20, 2010

(54) MOBILE TERMINAL APPARATUS AND SOFTWARE INSTALL METHOD

(75) Inventor: Koichiro Kasama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1183 days.

(21) Appl. No.: 11/360,390

(22) Filed: Feb. 24, 2006

(65) Prior Publication Data
US 2007/0124459 A1 May 31, 2007

(30) Foreign Application Priority Data
Nov. 28, 2005 (JP) .............................. 2005-342667

(51) Int. Cl.
*G06F 13/00* (2006.01)
(52) U.S. Cl. ..................... 719/327; 717/173; 717/178
(58) Field of Classification Search ................ 719/327; 717/173, 178
See application file for complete search history.

(56) References Cited

U.S. PATENT DOCUMENTS

2003/0023770 A1* 1/2003 Barmettler et al. .......... 709/327
2004/0267881 A1* 12/2004 Yao et al. .................... 709/203
2005/0246703 A1* 11/2005 Ahonen ....................... 717/172
2007/0101118 A1* 5/2007 Raghunath et al. ............ 713/2

FOREIGN PATENT DOCUMENTS

| JP | 2002-14784 | 1/2002 |
|---|---|---|
| JP | 2003-141011 | 5/2003 |
| JP | 2004-240490 | 8/2004 |
| JP | 2005-44201 | 2/2005 |

* cited by examiner

*Primary Examiner*—Andy Ho
(74) *Attorney, Agent, or Firm*—Staas & Halsey LLP

(57) ABSTRACT

A software-source monitoring unit monitors a software source that provides software required for using the peripheral device, and stores data pertaining to acquirable software and the software source in a corresponding manner in a memory unit. A peripheral-device monitoring unit monitors connection status of the peripheral device. A software-source selecting unit selects the software source based on the data stored in the memory unit when the peripheral-device monitoring unit detects the connection of the peripheral device. An install executing unit acquires the software from the software source selected by the software-source selecting unit.

15 Claims, 10 Drawing Sheets

FIG.3

| SOFTWARE-SOURCE ID | SOFTWARE-SOURCE NAME | PRIORITY | CONNECTION STATUS |
|---|---|---|---|
| IN | INTERNET | 4 | CONNECTED |
| WL | LOCAL CONNECTION (WIRELESS CONNECTION) | 3 | CONNECTED |
| WR | LOCAL CONNECTION (WIRED CONNECTION) | 2 | NOT CONNECTED |
| MC | MEMORY CARD | 1 | CONNECTED |

FIG.4

| DEVICE INFORMATION | SOFTWARE-SOURCE ID | FILE NAME | VERSION |
|---|---|---|---|
| W-LAN/FUJI/SDIO/Wxxxx | MC | xxx.drv | 1.5 |
|  | WL | xxx.drv | 1.7 |
| GPS/DOMO/SDIO/Gxxxx | WL | yyy.drv | 2.2 |
| ... | ... | ... | ... |

FIG.5

| DEVICE TYPE | MANU-FAC-TURER | INTER-FACE TYPE | ID | CON-NECTION STATUS | VERSION | INSTALL STATUS | NETWORK CON-NECTION | ACTION WHEN CON-NECTED | ACTION WHEN DIS-CONNECTING |
|---|---|---|---|---|---|---|---|---|---|
| W-LAN | FUJI | SDIO | Wxxxx | CON-NECTED | 1.7 | INSTALLED | NO | KEEP CURRENT | KEEP SOFTWARE |
| GPS | DOMO | SDIO | Gxxxx | NOT CON-NECTED | - | NOT INSTALLED | YES | UPDATE | REMOVE SOFTWARE |
| IC-RW | PONY | SDIO | Ixxxx | NOT CON-NECTED | 1.1 | INSTALLED | ASK | UPDATE | DEPENDING ON AVAILABAL SPACE |
| ... | ... | ... | ... | ... | ... | ... | ... | ... | ... |

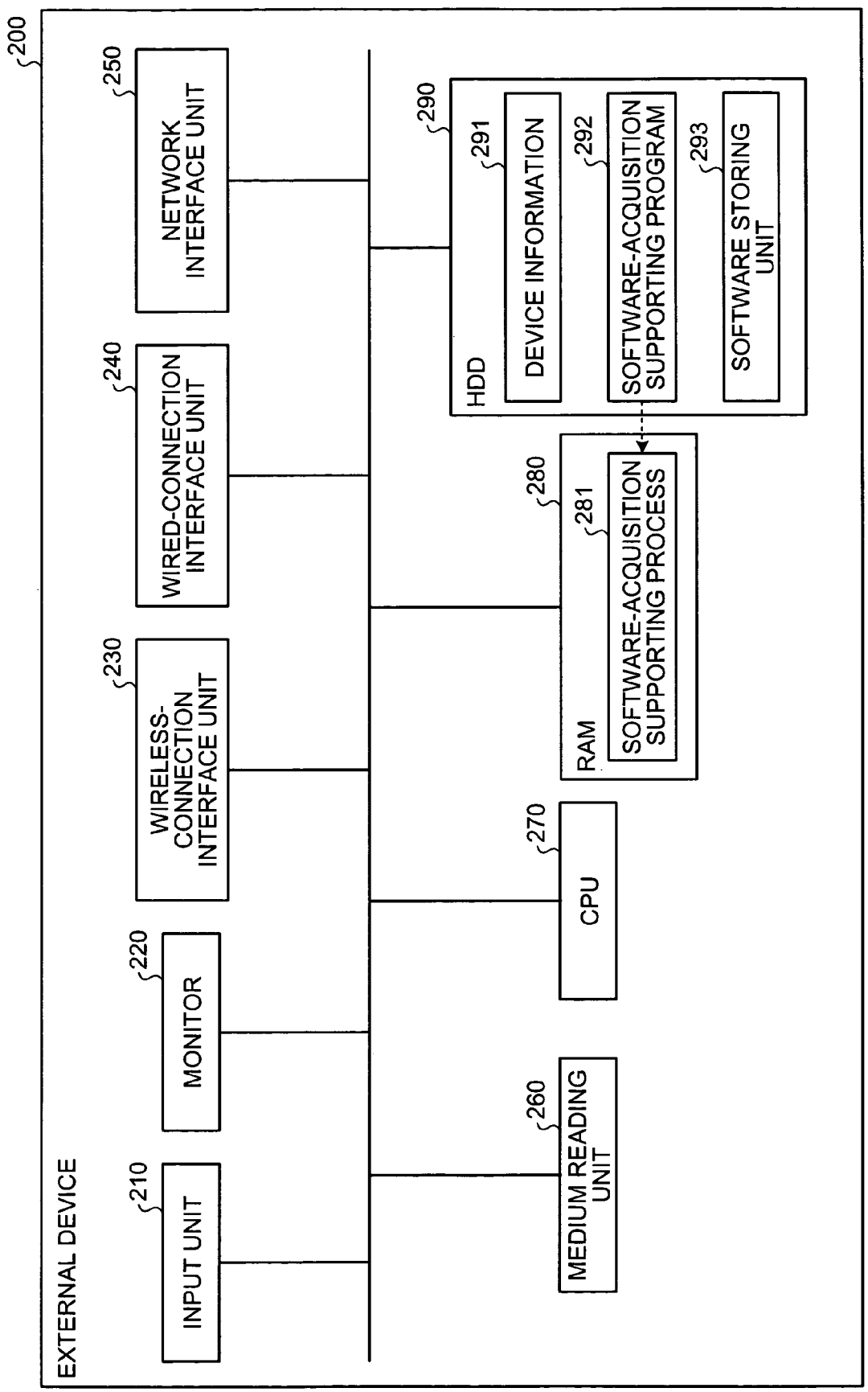

MOBILE TERMINAL APPARATUS AND SOFTWARE INSTALL METHOD

BACKGROUND OF THE INVENTION

1. Field of the Invention

The present invention relates to a technology for installing software in a mobile terminal apparatus to which a peripheral device can be connected.

2. Description of the Related Art

Recent advances in mobile phone telephony have given rise to multi-function mobile phone units that can, for instance, connect to the Internet, is equipped with camera functions, etc. The mobile phone units also come with audio-visual features and function as a television set, a radio set, etc. Though multi-functionality in a mobile phone unit is sought by users, the accompanying bulkiness and cost increase are deterring factors.

Therefore, research is underway for providing functions like global position system (GPS) on a separate peripheral device so that the peripheral device may be connected to the mobile phone unit whenever the need for its function arises. Thus, the user has a compact mobile phone unit having the basic functions and can be offered various types of peripheral devices for various specific functions. Thus, the user is free to connect the peripheral devices useful to the user with the user's own mobile phone unit.

However, to be able to control the peripheral device, the mobile phone unit must have installed on it software such as the drivers, application, etc. required for the peripheral device. For example, when a peripheral device having a GPS capability is connected to the mobile phone unit, the drivers or applications required for displaying map data, etc. must be installed on the mobile phone unit so that it can control the peripheral device.

An average user may not have in in-depth knowledge about software and would avoid any complicated process when using the mobile phone unit. Therefore, from the user's viewpoint, it is preferable that the software installation takes place automatically. Software required for using the peripheral device is different for different models of mobile phone units. Also, several versions of the same software, developed for the sake of fixing bugs or for providing additional functions, are usually available. Therefore, selecting the appropriate software is not easy for an average user.

Technology for automatic installation of software is well known where appropriate software is acquired via a network to expand the functionality of a personal computer by connecting the personal computer to a peripheral device (see, for example, Japanese Patent Application Laid-Open No. 2003-141011).

However, connecting to the network from a mobile phone unit is very expensive and the communication speed is also comparatively slow. Therefore, the software install method used for personal computers cannot be applied for mobile phone units.

A method of storing all the general software required for using all anticipated peripheral devices in the internal memory of the mobile phone unit can be contemplated. However, a large internal memory will be required to store all the software, thus pushing up the cost. Further, it would be difficult to control an unanticipated peripheral device for which the mobile phone unit does not already have the software, or the peripheral device whose software, though present in the internal memory, has bugs and needs fixing.

The problem not only concerns mobile phone units but also mobile game terminals.

SUMMARY OF THE INVENTION

It is an object of the present invention to at least solve the problems in the conventional technology.

A mobile terminal apparatus connectable to a peripheral device, according to one aspect of the present invention, includes a software-source monitoring unit that monitors a software source that provides software required for using the peripheral device, and stores data pertaining to acquirable software and the software source in a corresponding manner in a memory unit; a peripheral-device monitoring unit that monitors connection status of the peripheral device; a software-source selecting unit that selects the software source based on the data stored in the memory unit when the peripheral-device monitoring unit detects connection of the peripheral device; and an install executing unit that acquires the software from the software source selected by the software-source selecting unit.

A method of installing software in a mobile terminal apparatus connectable to a peripheral device, according to another aspect of the present invention, includes software-source monitoring including monitoring a software source that provides software required for using the peripheral device, and storing data pertaining to acquirable software and the software source in a corresponding manner in a memory unit; monitoring connection status of the peripheral device; selecting the software source based on the data stored in the memory unit when connection of the peripheral device is detected; and acquiring the software from the software source selected at the selecting.

A computer-readable recording medium according to still another aspect of the present invention stores a computer program for supporting an acquisition of software required for using a peripheral device connected to a mobile terminal apparatus. The computer program causes a computer to execute collecting data pertaining to software compatible with the mobile terminal apparatus based on model data of the mobile terminal apparatus registered in advance; acquiring the software based on the collected data; storing the acquire software in a memory unit; and sending the collected data and the stored software to the mobile terminal apparatus in response to a request from the mobile terminal apparatus.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a schematic of data organization of a software-source management table;

FIG. 4 is a schematic of data organization of a version management table;

FIG. 5 is a schematic of data organization of a peripheral-device management table;

FIG. 6 is a block diagram of an external device;

DETAILED DESCRIPTION OF THE PREFERRED EMBODIMENTS

Exemplary embodiments of the mobile terminal apparatus and the software install method according to the present invention are explained below with reference to the accompanying drawings. In the following description, the word "software" refers to software required for using a peripheral device.

Figure 1:
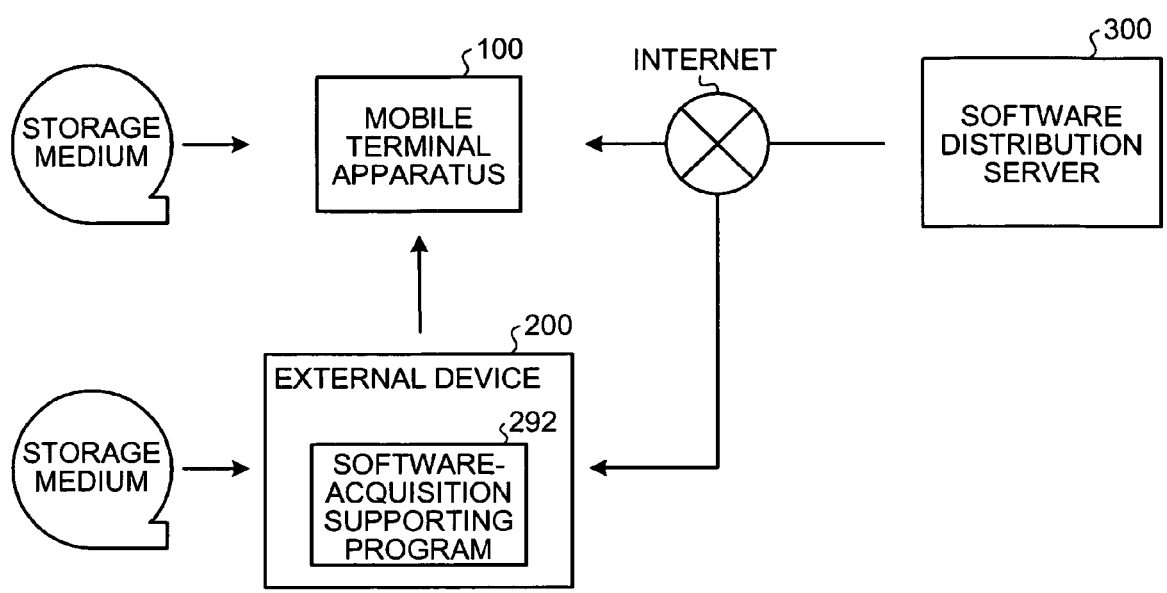
FIG. 1 is a schematic for explaining a software install method according to an embodiment of the present invention.

FIG. 1 is a schematic for explaining the software install method according to an embodiment of the present invention. A mobile terminal apparatus 100 includes a plurality of software sources.

One of the software sources is a storage medium such as a memory card that can be read by the mobile terminal apparatus 100. This storage medium can be provided by the manufacturer of the peripheral device or can be a storage medium available in the market in which the user has downloaded the relevant software over a network, and the like.

Another software source is a software distribution server 300 to which the mobile terminal apparatus 100 can connect via the Internet using its Internet connectivity function. The software distribution server 300 is run by a mobile phone service provider or the mobile phone manufacturer. The software distribution server 300 holds the latest software required for operating the peripheral device that can be connected to the mobile terminal apparatus 100.

Yet another software source is an external device 200 to which the mobile terminal apparatus 100 can be connected either wirelessly or via a cable. The external device 200 is an information processing apparatus such as a personal computer and includes a software-acquisition supporting program 292. When activated, the software-acquisition supporting program 292 monitors the storage medium such as a Compact Disk-Read Only Memory (CD-ROM) and the software distribution server 300 connected to the external device 200 via a network such as the Internet, and caches the software required by the mobile terminal apparatus 100 in the external device 200.

The software sources described above have their merits and demerits. The storage medium such as the memory card can be used to install software without having to connect to the Internet, and hence is inexpensive and requires very little time. However, the disadvantage of the storage medium is that it involves an immense amount of time and effort to store the software required for all the peripheral device that one might use and make sure that all the software are the latest versions.

Using the software distribution server 300 ensures that the all the software required for the peripheral devices are the latest. However, since the internet connectivity function of the mobile terminal apparatus 100 is comparatively slow, the communication cost incurred for downloading the software is high.

In the case of the external device 200, software that is downloaded by the personal computer at high speed and low cost can be acquired or loaded from the storage medium such as the CD-ROM. Therefore, the latest available software for all the peripheral devices can be obtained practically at no cost. However, the disadvantage of the external device 200 as a software source is that the mobile terminal apparatus 100 needs to be connected to the external device 200.

In the software install method according to the present embodiment, the appropriateness of these software sources are constantly monitored, and when a peripheral device is connected to the mobile terminal apparatus 100, an appropriate software source is automatically selected and software installation is automatically performed.

Figure 2:
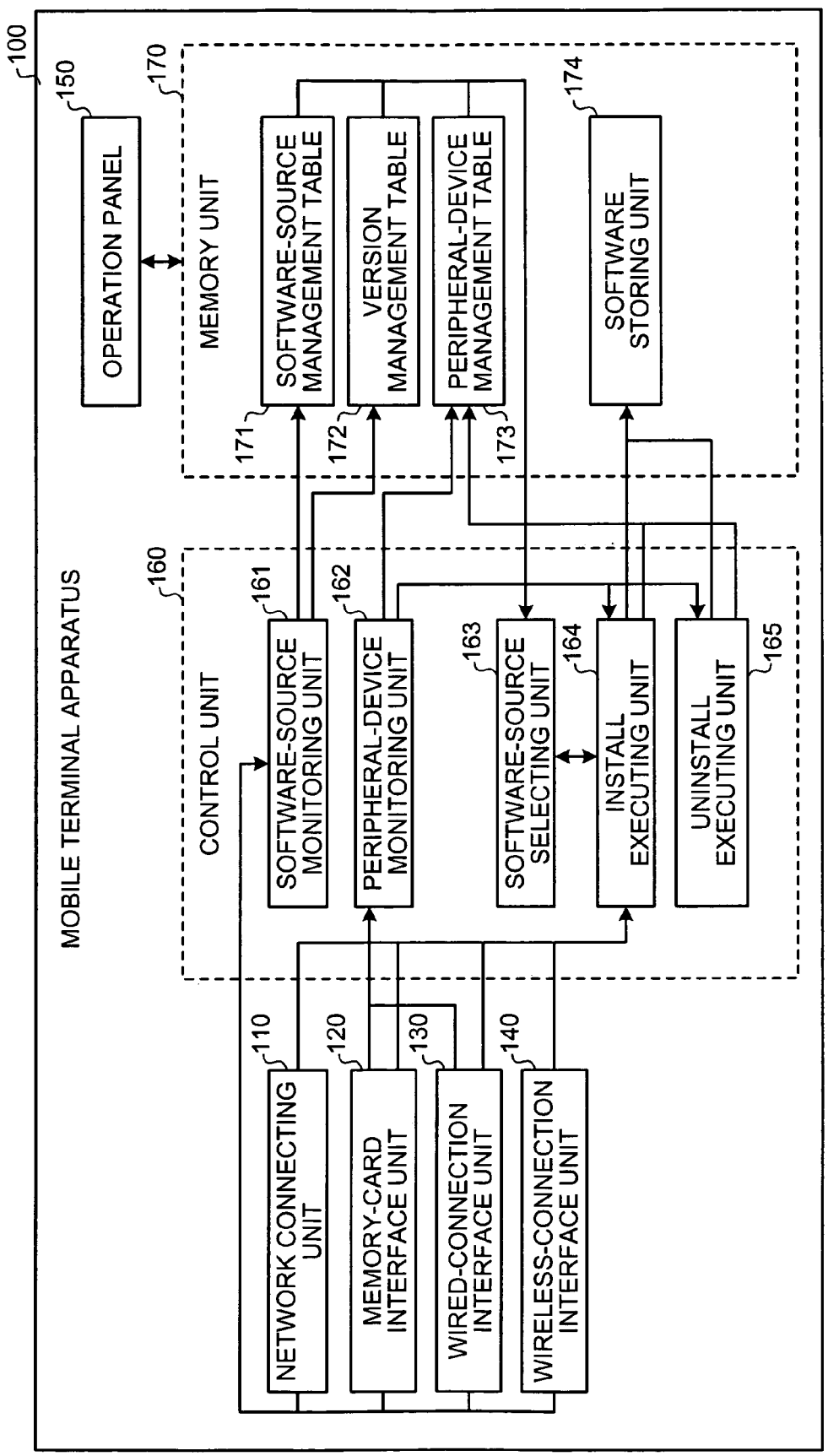
FIG. 2 is a block diagram of a mobile terminal apparatus according to the present embodiment.

FIG. 2 is a block diagram of the mobile terminal apparatus 100 according to the present embodiment. The parts of the mobile terminal apparatus 100 that are not relevant to software installation (such as, parts required for a communication function) are not shown in FIG. 2.

The mobile terminal apparatus 100 includes a network connecting unit 110, a memory-card interface unit 120, a wired-connection interface unit 130, a wireless-connection interface unit 140, an operation panel 150, a control unit 160, and a memory unit 170.

The network connecting unit 110 is a device for connecting the mobile terminal apparatus 100 to the Internet. The memory-card interface unit 120 is an interface device that is required to read data from and write data to the memory card. The memory-card interface unit 120 also doubles as a peripheral device connection interface. Peripheral devices, such as a Global Positioning System (GPS) can be connected to the memory-card interface unit 120.

The wired-connection interface unit 130 is a device by which the mobile terminal apparatus 100 can be connected to the external device 200 via a cable, such as Universal Serial Bus (USB). The wireless-connection interface unit 140 is a device by which the mobile terminal apparatus 100 can be connected to the external device 200 wirelessly, such as by Bluetooth technology. The wired-connection interface unit 130 also doubles as the peripheral device connection interface.

The operation panel 150 includes a display screen for displaying data, and a keyboard, etc. for accepting input from the user. The control unit 160 controls the entire mobile terminal apparatus 100 and includes a software-source monitoring unit 161, a peripheral-device monitoring unit 162, a software-source selecting unit 163, an install executing unit 164, and an uninstall executing unit 165.

The software-source monitoring unit 161 monitors the software sources to determine their appropriateness, and sets the determination result in a software-source management table 171 in the memory unit 170. Specifically, if the network connecting unit 110 is in a communicable mode, the software-source monitoring unit 161 determines that the network connecting unit 110 can be used as the software source. If a memory card is inserted in the memory-card interface unit 120, the software-source monitoring unit 161 determines that the memory-card interface unit 120 can be used as the software source. If the mobile terminal apparatus 100 is connected to the external device 200 via the wired-connection interface unit 130 or the wireless-connection interface unit 140, the software-source monitoring unit 161 determines that the wired-connection interface unit 130 or the wireless-connection interface unit 140 can be used as the software source.

FIG. 3 is a schematic of data organization of the software-source management table 171. The software-source management table 171 lists the software sources in their priority and includes the fields Software-source ID, Source name, Priority, and Connection status. Data is entered in all the fields for each software source.

The field Software-source ID refers to the IDs assigned to the software sources to distinguish them from one another.

The field Source name refers to the name of the software source. The field Priority refers to data pertaining to a deciding factor for selecting a software source when a plurality of software sources provides the same version of the software for the same peripheral device. The smaller the value is, the higher the priority is. The field Connection status refers to data pertaining to whether the software source is connected to the mobile terminal apparatus 100, and may have one of two values, namely, "Connected" and "Not connected".

The software-source management table 171 shown in FIG. 3 contains data pertaining to four items. However, the number of items in the software-source management table 171 varies depending on the configuration of the mobile terminal apparatus 100. For example, if the wireless-connection interface unit 140 is not provided in the mobile terminal apparatus 100, data corresponding to the wireless-connection interface unit 140 will be absent in the software-source management table 171, and the software-source management table 171 will contain only three items.

The data in the first row, "IN" in the field Software-source ID and "Internet" in the field Source name, corresponds to the network connecting unit 110. The data in the second row, "WL" in the field Software-source ID and "Local connection (Wireless connection)" in the field Source name, corresponds to the wireless-connection interface unit 140. The data in the third row, "WR" in the field Software-source ID and "Local connection (Wired connection)" in the field Source name, corresponds to the wired-connection interface unit 130. The data in the fourth row, "MC" in the field Software-source ID and "Memory card" in the field Source name, corresponds to the memory-card interface unit 120.

The Priority field has the value 4 in the first row, 3 in the second row, 2 in the third row, and 1 in the fourth row, indicating that the highest priority is assigned to the memory-card interface unit 120, the next highest priority is assigned to the wired-connection interface unit 130, followed by the wireless-connection interface unit 140, and finally the network connecting unit 110. By setting the priority in this way, the fastest and most inexpensive software source is selected on priority basis when the same version of the software is available with a plurality of software sources.

The Connection field status has the value "Connected" in the first row, second row and the fourth row, and "Unconnected" in the third row, indicating that the network connecting unit 110, the wireless-connection interface unit 140, and the memory-card interface unit 120 are available as the software sources, whereas the wired-connection interface unit 130 is not available.

The software-source monitoring unit 161 then acquires data pertaining to the software required by the mobile terminal apparatus 100 from the available software sources and stores the acquired data in a version management table 172 of the memory unit 170. Specifically, if the memory-card interface unit 120 is determined to be available as the software source, the software-source monitoring unit 161 searches for the software that can be installed on the mobile terminal apparatus 100 in the inserted memory card, and writes the result of the search in the version management table 172. The software-source monitoring unit 161 determines whether a software file is the right file for operating the peripheral device or whether the software file is compatible with the mobile terminal apparatus 100 by the extension of the file or by specific data within the file.

If the wired-connection interface unit 130 or the wireless-connection interface unit 140 is determined to be available as the software source, the software-source monitoring unit 161 queries the software-acquisition supporting program 292 of the connected external device 200 about the software available on the external device 200, and stores the result of the query in the version management table 172.

If a particular software source is no longer available, the software-source monitoring unit 161 removes the data corresponding to that software source from the version management table 172. Thus, by storing the data pertaining to software available with various software sources in the version management table 172, the software-source monitoring unit 161 is quickly able to determine from which software source to acquire the software, when a peripheral device is connected to the mobile terminal apparatus 100.

According to the present embodiment, to avoid communication cost, no query pertaining to the software is sent by the software-source monitoring unit 161 to the software distribution server 300 even if the network connecting unit 110 is determined to be available as the software source. If communication cost poses no problem, the software-source monitoring unit 161 can be configured to periodically acquire, via the network connecting unit 110, data pertaining to the available software from the software distribution server 300.

FIG. 4 is a schematic of data organization of the version management table 172. The version management table 172 is a table for keeping track of the software available with the software sources and their versions. The version management table 172 includes the fields Device information, Software-source ID, File name, and Version. The version management table 172 can contain several sets of Software-source ID through Version corresponding to a single Device information.

The field Device information refers to data distinguishing the peripheral device compatible with the software and is represented by a combination of the device type, manufacturer's ID, interface name, and a unique device ID. The field Software-source ID refers to the ID of the software source and corresponds to the field Software-source ID of the software-source management table 171. The field File name refers to the file name of the software. The field Version refers to the version of the software.

The version management table 172 shown in FIG. 4 contains data pertaining to the peripheral device having the device information W-LAN/FUJI/SDIO/Wxxxx. The device information W-LAN/FUJI/SDIO/Wxxxx indicates that peripheral device is a wireless LAN device (W-LAN) manufactured by Fuji, connects to the mobile terminal apparatus 100 by a memory-card interface unit SDIO, and is recognized by the mobile terminal apparatus 100 as a device having an ID Wxxxx.

There are two sets of data stored against the device information W-LAN/FUJI/SDIO/Wxxxx, indicating that two software sources are available for this peripheral device. From FIG. 4, it can be discerned that one of the software sources is MC, that is, the memory-card interface unit 120, and that Version 1.5 of the file xxx.drv can be acquired from the memory card connected to the memory-card interface unit 120, and that the other software source is WL, that is, the wireless-connection interface unit 140, and that Version 1.7 of the file xxx.drv can be acquired from the external device 200 wirelessly connected to the mobile terminal apparatus 100.

FIG. 4 also shows data pertaining to the peripheral device having the device information GPS/DOMO/SDIO/Gxxxx. The device information GPS/DOMO/SDIO/Gxxxx indicates that peripheral device is a GPS device manufactured by Domo, connects to the mobile terminal apparatus 100 by a memory-card interface unit SDIO, and is recognized by the mobile terminal apparatus 100 as a device having an ID Dxxxx.

There is only set of data stored against the device information GPS/DOMO/SDIO/Gxxxx, indicating that only one software source is available for this peripheral device. The software source is WL, that is the wireless-connection interface unit 140, and Version 2.2 of the file yyy.drv can be acquired from the external device 200 wirelessly connected to the mobile terminal apparatus 100.

The software distribution server 300 contains software pertaining to a large number of peripheral devices. Therefore, when retrieving data pertaining to software for the peripheral devices that can be connected to the mobile terminal apparatus 100 from the software distribution server 300 via the external device 200, it may happen that more data is acquired than can be stored in the version management table 172. To prevent this from happening, data pertaining to only the software relevant to the peripheral device actually connected to the mobile terminal apparatus 100 may be obtained from the software distribution server 300. Data pertaining to the peripheral devices actually connected to the mobile terminal apparatus 100 can be acquired from a peripheral-device management table 173 stored in the memory unit 170.

The peripheral-device monitoring unit 162 monitors the connection status of the peripheral devices and registers the result in the peripheral-device management table 173 stored in the memory unit 170. Specifically, the peripheral-device monitoring unit 162 monitors the memory-card interface unit 120 and the wired-connection interface unit 130, and when a peripheral device is detected, registers the observation in the peripheral-device management table 173. Similarly, if a peripheral device is disconnected from the memory-card interface unit 120 and the wired-connection interface unit 130, the peripheral-device monitoring unit 162 registers the observation in the peripheral-device management table 173.

When a peripheral device is detected, the peripheral-device monitoring unit 162 notifies the install executing unit 164, and if necessary, prompts the install executing unit 164 to install the software. Similarly, when a peripheral device is disconnected, the peripheral-device monitoring unit 162 notifies the uninstall executing unit 165, and if necessary, prompts the uninstall executing unit 165 to uninstall the software.

FIG. 5 is a schematic of data organization of the peripheral-device management table 173. The peripheral-device management table 173 is used for managing the various peripheral devices, the status of the software for operating the peripheral device and the usage status of the software. The peripheral-device management table 173 contains the fields Device type, Manufacturer, Interface type, ID, Connection status, Version, Install status, Network connection, Action when connected, and Action when disconnecting.

The field "Device type" refers to data indicating the type of the peripheral device, the field Manufacturer refers to data identifying the manufacturer, the field Interface type refers to the interface name, and the field ID refers to the unique ID of the peripheral device. The field Connection status refers to data pertaining to whether the peripheral device is connected to the mobile terminal apparatus 100, and may have one of two values, namely, "Connected" and "Not connected".

The field "Version" refers to the version of the installed software. If no software is installed on the peripheral device, the Version field remains blank. The field Install status refers to data pertaining to whether the software for the peripheral device is installed and may have one of two values, namely, "Installed" and "Not installed".

The field "Network connection" refers to data pertaining to whether software is to be acquired by using the Internet connectivity function of the mobile terminal apparatus 100, and may have any one of the values No, Yes, and Ask. The default value for the field Network connection is Ask, which indicates that when software is required to be acquired by connecting to the Internet, the user is to be asked first whether to connect to the Internet. The user can change the setting of Network connection to No or Yes, as the situation demands. Thus, by providing an option for whether to connect to the Internet to acquire the software required for the peripheral device, the communication cost can be curtailed.

The field "Action when connected" refers to the action to be taken when the peripheral device is connected to the mobile terminal apparatus 100, and may have one of two values, namely, Keep Current and Update. The value Keep current indicates that the existing installed software be used as it is. The value Update indicates that even if the software is already installed, if a later version is available with any of the software sources, the later version be installed.

The field "Action when disconnecting" refers to the action to be taken when disconnecting the peripheral device from the mobile terminal apparatus 100, and may have any one of the values, namely, Keep software, Remove software, and Depending on available space. The value Keep software indicates that the software be kept installed. The value Remove software indicates that the software be uninstalled. The value Keep/Remove according to space availability indicates that the software be kept installed if the free space in a software storing unit 174 of the memory unit 170 is equal to or greater than a threshold value, and be uninstalled if the free space is less than the threshold value. The settings in the fields Action when connected and Action when disconnecting can be changed according to user requirement.

When a peripheral device is detected, the peripheral-device monitoring unit 162 checks whether data pertaining to the peripheral device is present in the peripheral-device management table 173, and if the data is not found, registers the data in the peripheral-device management table 173. If the data is found, the peripheral-device monitoring unit 162 updates the Connection status field to Connected. When the peripheral device is no longer detected due to being disconnected, the peripheral-device monitoring unit updates the Connection status field to "Not connected". Data deletion from the peripheral-device management table 173 takes place only upon instruction by the user.

The software-source selecting unit 163 determines which software source is to be used for retrieving software for the peripheral device that is connected to the mobile terminal apparatus 100. Specifically, if the software is already installed and the Action when connected field of the peripheral-device management table 173 has the value Keep current, the software-source selecting unit 163 determines that software installation is not required.

If no software is installed or if the Action when connected field does not have the value Keep current, the software-source selecting unit 163 looks up the software-source management table 171 and selects the software source providing the latest version of the software from among the software sources providing the software for the connected peripheral device. If the same version of the software is available with a plurality of software sources, the software-source selecting unit 163 selects the software source having the highest priority from the software-source management table 171.

However, if the version of the software of the selected software source is found to be older than the version already installed on the mobile terminal apparatus 100, the software-source selecting unit 163 determines that software installation is not required.

The install executing unit 164 installs software. Upon receiving a notification from the peripheral-device monitoring unit 162 that a peripheral device has been connected, the install executing unit 164 prompts the software-source selecting unit 163 to select a software source, obtains the software from the selected software source, and installs the software. If the software-source selecting unit 163 determines that software installation is not required, the install executing unit 164 does not perform the installation process.

If no software source is available for the software-source selecting unit 163 to select, the install executing unit 164 acquires the software from the software distribution server 300 via the network and installs the acquired software. If the mobile terminal apparatus 100 is connected to the external device 200 and no software source is available for the software-source selecting unit 163 to select, the install executing unit 164 acquires the software via the external device 200 without making use of the internet connectivity function of the mobile terminal apparatus 100, thus keeping down the communication cost.

Once the software is installed, the install executing unit 164 sets the value Installed in the Install status field, and the version of the installed software in the Version field of the peripheral-device management table 173.

The uninstall executing unit 165 uninstalls software. Upon receiving a notification from the peripheral-device monitoring unit 162 that the peripheral device has been disconnected, the uninstall executing unit 165 looks up the Action when disconnecting field of the peripheral-device management table 173, and if the value is either Remove software or Keep/Remove according to space availability and the free space in the software storing unit 174 is less than the threshold value, uninstalls the software.

Once the software is uninstalled, the uninstall executing unit 165 sets the value Not installed in the Install status field, and a blank in the Version field of the peripheral-device management table 173.

The memory unit 170 is a storage unit that stores various types of data, and includes the software-source management table 171, the version management table 172, the peripheral-device management table 173, and the software storing unit 174. The software-source management table 171, the version management table 172, the peripheral-device management table 173 have been described in detail. The software storing unit 174 is an area where the software installed by the install executing unit 164 are stored.

The external device 200 is described next. FIG. 6 is a block diagram of the external device 200. The external device 200 includes an input unit 210, a monitor 220, a wireless-connection interface unit 230, a wired-connection interface unit 240, a network interface device 250, a medium reading unit 260, a central processing unit (CPU) 270, a random access memory (RAM) 280, and a hard disk drive (HDD) 290.

The input unit 210 accepts input from the user and includes a keyboard and a mouse. The monitor 220 displays various types of data and is a liquid crystal display device.

The wireless-connection interface unit 230 connects the external device 200 to other information processing devices wirelessly, such as by Bluetooth technology. The wired-connection interface unit 240 connects the external device 200 to other information processing devices via a cable, such as the USB. The network interface device 250 connects the external device 200 to the Internet. The medium reading unit 260 reads data from a recording medium, such as a CD-ROM, and the like.

The CPU 270 controls the implementation of the various processes by executing a program. For instance, to implement a software-acquisition supporting process for a software required for the mobile terminal apparatus 100, the CPU 270 reads the software-acquisition supporting program 292 stored in the HDD 290, launching it as a software-acquisition supporting process 281 in the RAM 280, making the software-acquisition supporting process 281 executable.

The RAM 280 is a working memory and is used by the CPU 270 for launching a program, data, etc., whenever the need arises. The HDD 290 is a storage device for storing various types of data, and stores device information 291 and the software-acquisition supporting program 292. The HDD 290 includes a software storing unit 293.

The device information 291 pertains to information necessary for selecting the software required for the mobile terminal apparatus 100. The software-acquisition supporting program 292 acquires the software required for establishing a connection between the external device 200 and the mobile terminal apparatus 100 from either a recording medium such as CD-ROM or from the software distribution server 300, and caches the acquired software in the software storing unit 293.

Upon being read by the CPU 270 when the external device 200 is started up, the software-acquisition supporting program 292 is launched as the software-acquisition supporting process 281. The software-acquisition supporting process 281 process involves searching for and caching the software when other processes are idle, and providing the information pertaining to the cached software or sending the software itself to the mobile terminal apparatus 100 that is connected to the external device 200 wirelessly or via a cable, according to the requirement of the mobile terminal apparatus 100.

Figure 7:
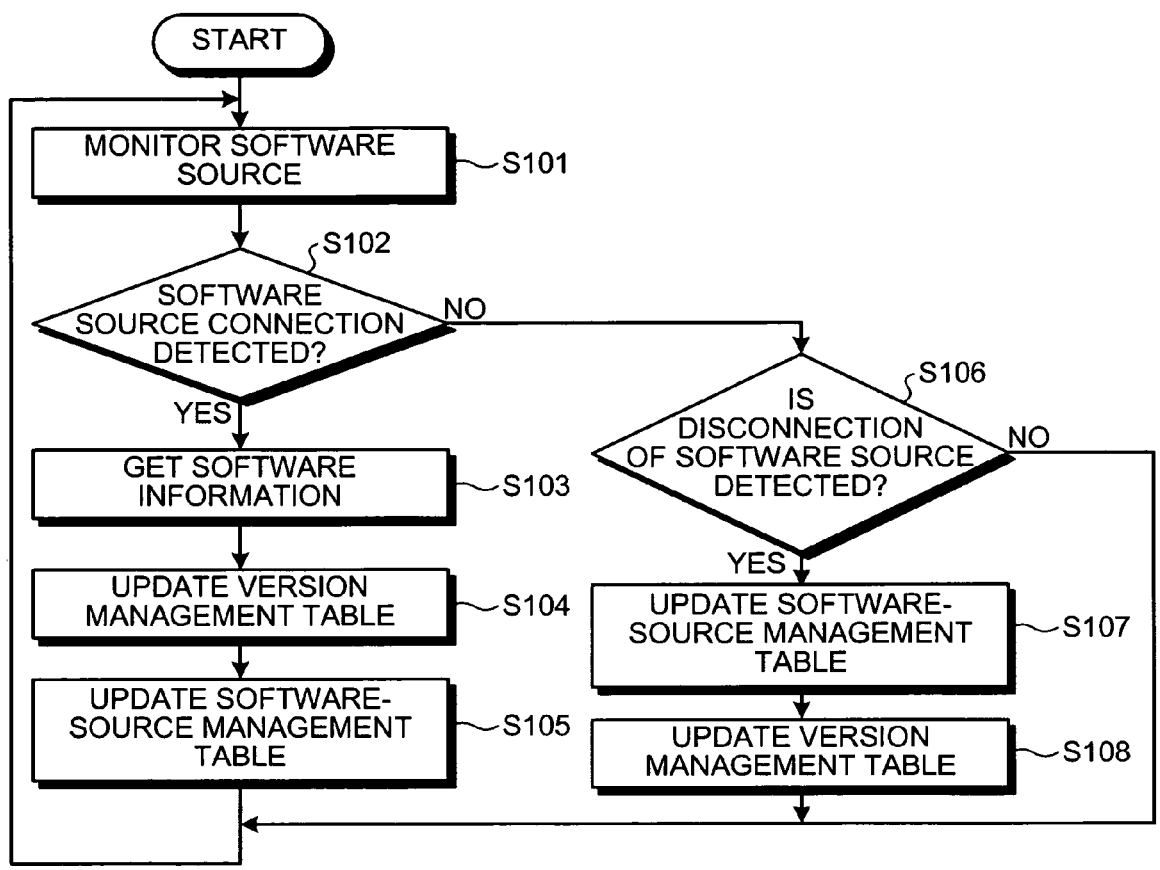
FIG. 7 is a flowchart of functioning of a software-source monitoring unit.

FIG. 7 is a flowchart of the functioning of the software-source monitoring unit 161.

The software-source monitoring unit 161 monitors the software sources (step S101) and if connection of any of the software sources is detected ("Yes" at step S102), gets information pertaining to software available with the software source (step S103), and updates the version management table 172 based on the information obtained (step S104). The software-source monitoring unit 161 then updates the Connection status field of the software-source management table 171, indicating that the concerned software source is connected and available (step S105).

If disconnection of the software source is detected ("Yes" at step S106), the software-source monitoring unit 161 updates the Connection status field of the software-source management table 171, indicating that the software source is disconnected (step S107), and deletes data pertaining to the software source from the version management table 172 (step S108).

Figure 8:
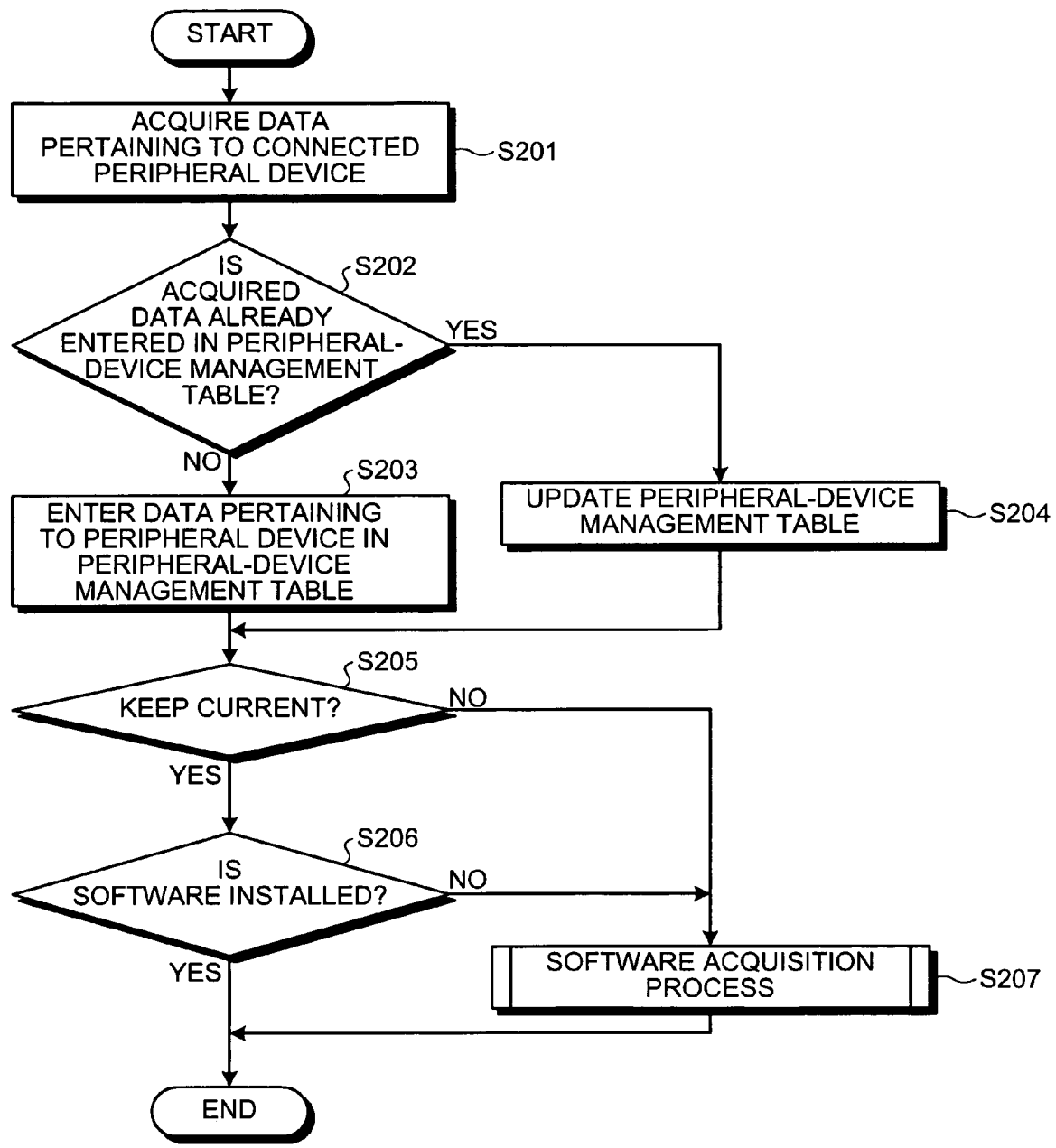
FIG. 8 is a flowchart of a process procedure when a peripheral device is connected.

FIG. 8 is a flowchart of the processing procedure when the peripheral device is connected. When a peripheral device is connected to the mobile terminal apparatus 100, the peripheral-device monitoring unit 162 acquires data pertaining to the connected peripheral device (step S201). The peripheral-device monitoring unit 162 checks whether the acquired-data pertaining to the peripheral device is already entered in the peripheral-device management table 173 (Step S202), and if no entry is found ("No" at step S202), enters the data (step S203). If the data already exists ("Yes" at step S202), the peripheral-device monitoring unit 162 updates the Connection status field of the peripheral-device management table 173, indicating that the concerned peripheral device is connected (step S204).

The software-source selecting unit 163 acquires the data pertaining to the peripheral device from the peripheral-device management table 173. If the Action when connected field has the value "Keep current" (step S205) and the Install status field has the value "Installed" (step S206), the software-source selecting unit 163 determines that software installation is not required and terminates the process. If either the Action when connected field does not have the value Update or the Install status field has the value Not installed ("No" at either step S205 or step S206), the software-source selecting unit 163 carries out a software acquisition process described later (step S207).

Figure 9:
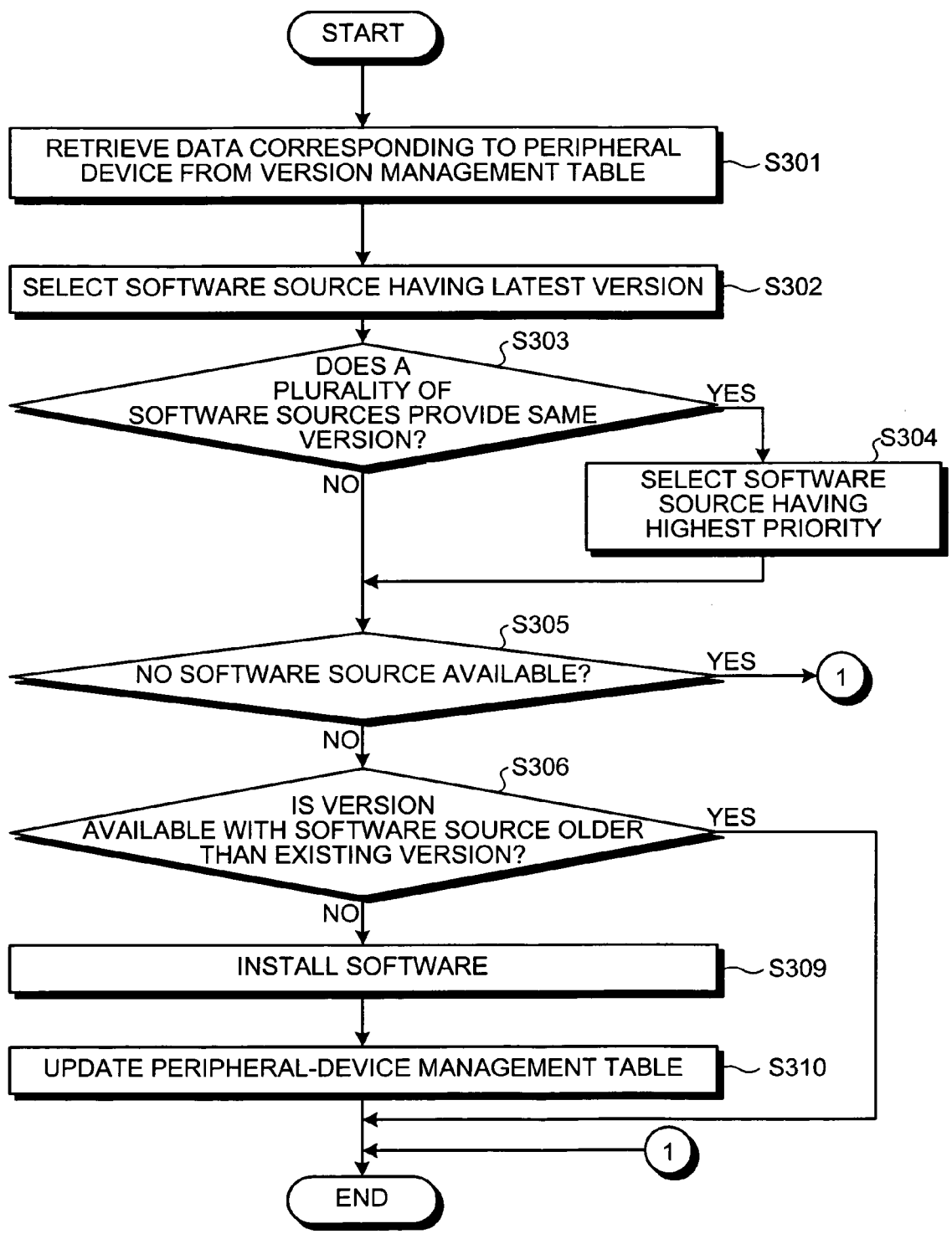
FIG. 9 is a flowchart of a processing procedure for a software acquisition process.
Figure 10:
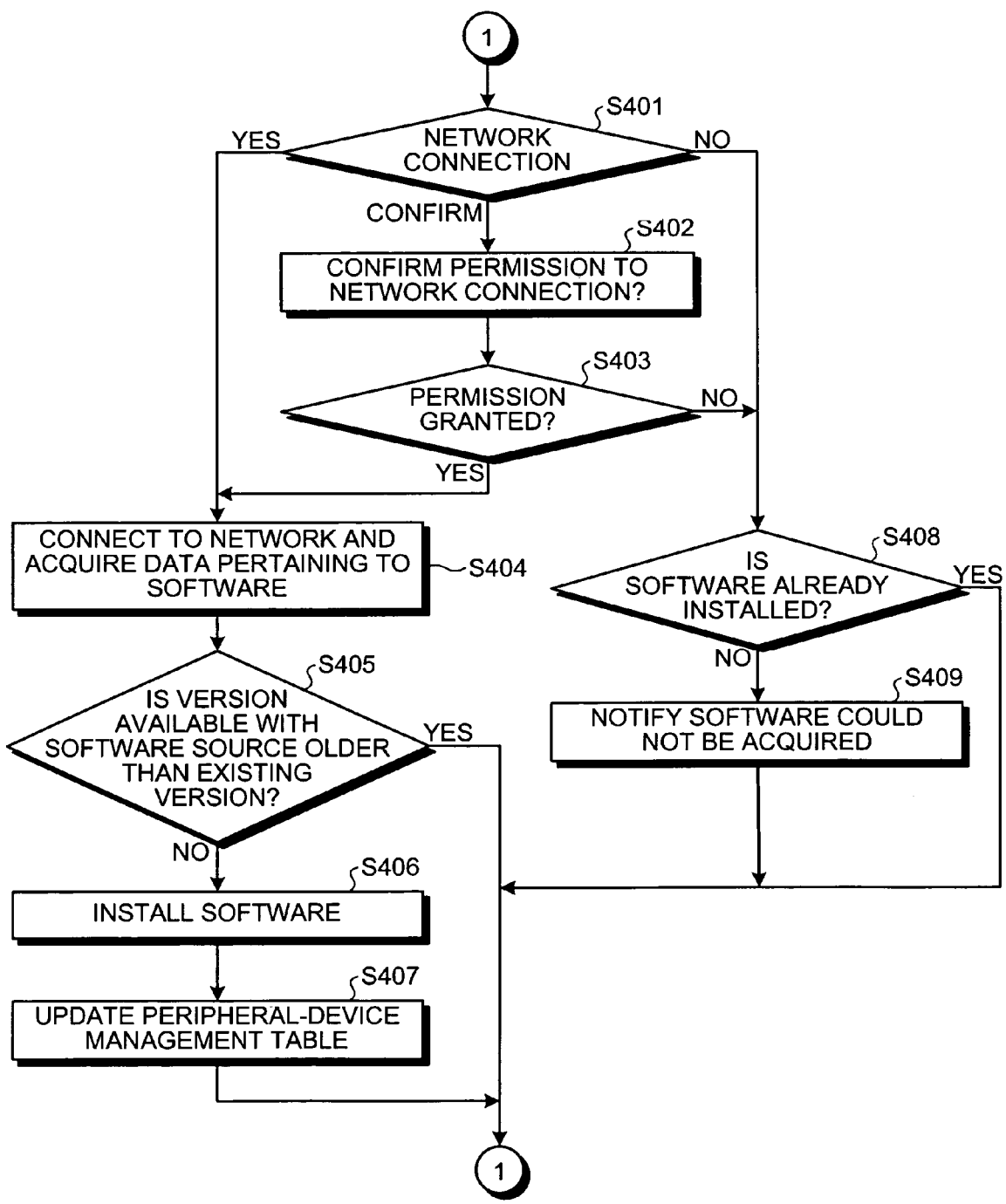
FIG. 10 is a flowchart of a processing procedure for the software acquisition process.

FIGS. 9 10 are flowcharts of processing procedures for the software acquisition process. The software-source selecting unit 163 retrieves all the data corresponding to the peripheral device connected to the mobile terminal apparatus 100 (step S301) as potential software-source candidates.

From the potential software-source candidates, the software-source selecting unit 163 then selects the software source having the highest value in the Version field (step S302). If a plurality of software sources provides the same version of the software ("Yes" at step S303), the software-source selecting unit 163 selects the software source having the highest priority from the software-source management table 171 (step S304).

Once the software source is selected thus ("No" at step S305), the software-source selecting unit 163 compares the version of the software available with the selected software source with that of the software already installed on the mobile terminal apparatus 100. If the version of the software available with the selected software source is lower than the version of the existing software ("Yes" at step S306), the process is terminated without installing the software.

If the version of the software available with the selected software source is higher than the existing software, or if no software is installed on the mobile terminal apparatus 100 to begin with ("No" at step S306), the install executing unit 164 acquires and installs the software from the software source (step S307) and modifies the Install status field of the peripheral-device management table 173, indicating that the software is installed (step S308).

If no software source is available, that is, connected ("Yes" at step S305), the install executing unit 164 tries to acquire the software from the software distribution server 300. The peripheral-device monitoring unit 162 retrieves the data pertaining to the connected peripheral device from the peripheral-device management table 173 and checks the value set in the Network connection field. If the value in the Network connection field is Ask ("Ask" at step S401), the install executing unit 164 asks for user permission to connect to the network to acquire the software (step S402).

If the value in the Network connection field is Yes ("Yes" at step S401) or if the user grants permission to access the Internet ("Yes" at step S403), the install executing unit 164 acquires data pertaining to the software required for the peripheral device from the software distribution server 300 (step S404).

If a software is already installed on the mobile terminal apparatus 100 and the version of the software available with the software distribution server 300 is lower than that of the software installed on the mobile terminal apparatus 100 ("Yes" at step S405), the process is terminated without installing the software.

If no software is installed on the mobile terminal apparatus 100 or if the version of the software available with the software distribution server 300 is higher than that of the software installed on the mobile terminal apparatus 100 ("No" step S405), the install executing unit 164 acquires and installs the software from the software distribution server 300 (step S406), and updates the Install status field of the peripheral-device management table 173, indicating that the software is installed (step S407).

If the value of the Network connection field is No ("No" at step S401) or if no permission is granted by the user to connect to the Internet ("No" at step S403), the process is terminated without installing the software. If the software is not already installed on the mobile terminal apparatus 100 ("No" at step S408), the install executing unit 164 notifies the user that the software could not be acquired (step S409).

Figure 11:
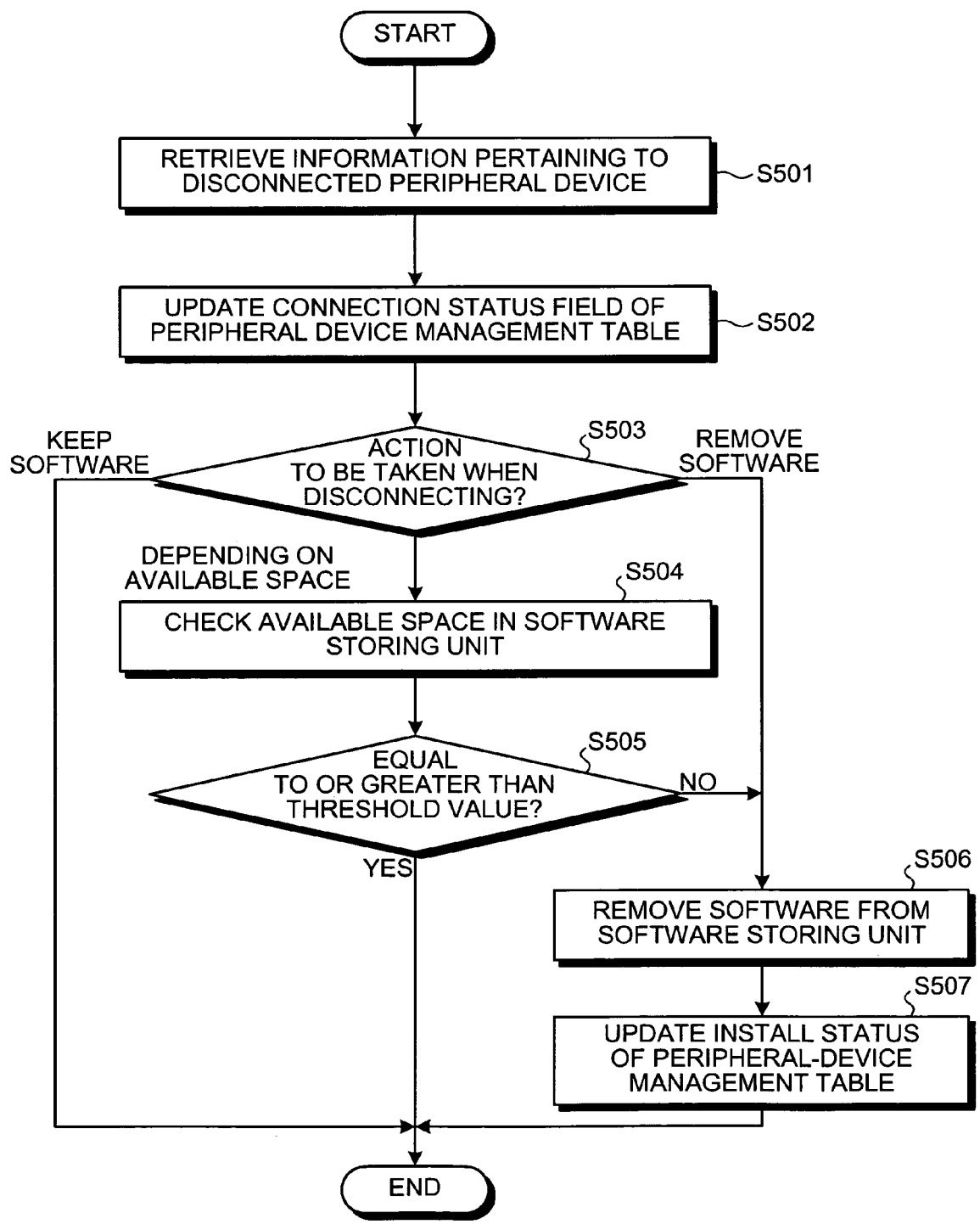
FIG. 11 is a flowchart of a process procedure when the peripheral device is disconnected.

FIG. 11 is a flowchart of the processing procedure when the peripheral device is disconnected. When the peripheral device is disconnected from the mobile terminal apparatus 100, the peripheral-device monitoring unit 162 retrieves the data pertaining to the disconnected peripheral device (step S501), and updates the Connection status field of the peripheral-device management table 173, indicating that the peripheral device is disconnected (step S502).

The uninstall executing unit 165 then retrieves data the data pertaining to the disconnected peripheral device from the peripheral-device management table 173 and checks the value of the Action when disconnecting field (step S503). If the value is Keep/Remove according to space availability ("Keep/Remove according to space availability" at step S503), the uninstall executing unit 165 checks the free space available in the software storing unit 174 (step S504).

If the value of the Action when disconnecting field is Keep ("Keep" at step S503), or if the free space in the software storing unit 174 is equal to or greater than the threshold value ("Yes" at step S505), the process is terminated without uninstalling the software. If the value of the Action when disconnecting field is Remove ("Remove" at step S503), or if the free space in the software storing unit 174 is less than the threshold value ("No" at step S505), the uninstall executing unit 165 uninstalls the software (step S506) and updates the Install status field of the peripheral-device management table 173, indicating that the software is uninstalled (step S507).

As described above, according to the present embodiment, all the available software sources are monitored and information pertaining to the software, such as version, etc., available with each of the software sources is acquired. When a peripheral device is connected to the mobile terminal apparatus, an appropriate software source is selected based on the version data and the priority set for the software sources. Consequently, the latest software for using the peripheral device is quickly and automatically acquired from the most appropriate software source.

According to the present invention, when a peripheral device is connected to a mobile terminal apparatus, the software required for using the peripheral device can be automatically and quickly acquired from the most appropriate software source and installed.

Furthermore, according to the present invention, a memory unit of the mobile terminal apparatus having storage space constraints can be efficiently used.

Moreover, according to the present invention, the latest version of the software is automatically acquired and installed.

Furthermore, according to the present invention, the software is automatically acquired from the software source based on the priority.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A mobile terminal apparatus connectable to a peripheral device, the mobile terminal apparatus comprising:
   a software-source monitoring unit that monitors a software source that provides software required for using the peripheral device, and stores data pertaining to acquirable software and the software source in a corresponding manner in a memory unit;
   a peripheral-device monitoring unit that monitors connection status of the peripheral device;
   a software-source selecting unit that selects the software source based on the data stored in the memory unit when the peripheral-device monitoring unit detects connection of the peripheral device; and
   an install executing unit that acquires the software from the software source selected by the software-source selecting unit.

2. The mobile terminal apparatus according to claim 1, further comprising:
   an uninstall executing unit that uninstalls the software when the peripheral-device monitoring unit detects disconnection of the peripheral device.

3. The mobile terminal apparatus according to claim 2, wherein
   the memory unit includes a peripheral-device management table in which an action when disconnecting is set, and
   when the action when disconnecting is set to keep a current software, the uninstall executing unit does not uninstall the software even if the peripheral-device monitoring unit detects disconnection of the peripheral device.

4. The mobile terminal apparatus according to claim 2, wherein
   the memory unit includes a software storing unit that stores the software, and
   when an available space in the software storing area is greater than a predetermined value, the uninstall executing unit does not uninstall the software even if the peripheral-device monitoring unit detects disconnection of the peripheral device.

5. The mobile terminal apparatus according to claim 1, wherein
   the software-source monitoring unit stores data including version information of the software in the memory unit, and
   the software-source selecting unit selects the software source that provides a latest version of the software when a plurality of software-sources provides the software at the same time.

6. The mobile terminal apparatus according to claim 5, wherein
   the software-source selecting unit selects the software source based on a preset priority when a plurality of software sources provides the latest version of the software at the same time.

7. The mobile terminal apparatus according to claim 5, wherein
   the software-source selecting unit suspends software installation if the software is already installed and the version of the installed software is equal to or higher than a version of the software available from any of the software sources.

8. The mobile terminal apparatus according to claim 1, wherein
   the install executing unit acquires the software using a communication function of the mobile terminal apparatus if information pertaining to the software does not exist in the memory unit.

9. The mobile terminal apparatus according to claim 8, wherein
   the install executing unit confirms a user permission before acquiring the software using the communication function of the mobile terminal apparatus.

10. The mobile terminal apparatus according to claim 1, wherein
    the install executing unit acquires the software using a communication function of an information processing apparatus connected to the mobile terminal apparatus by a cable if information pertaining to the software does not exist in the memory unit.

11. The mobile terminal apparatus according to claim 10, further comprising:
    a wireless-connection interface unit that wirelessly connects the information processing apparatus to the mobile terminal apparatus.

12. The mobile terminal apparatus according to claim 1, further comprising:
    a memory-card interface unit for connecting a memory card to the mobile terminal apparatus, wherein
    the software-source monitoring unit monitors the memory-card interface unit as the software source, and acquires the information pertaining to the software by searching the memory card connected via the memory-card interface unit.

13. The mobile terminal apparatus according to claim 10, further comprising:
    a wired-connection interface unit that connects the information processing apparatus to the mobile terminal apparatus, wherein
    the software-source monitoring unit monitors the wired-connection interface unit provided in the mobile terminal apparatus as the software source, and acquires the information pertaining to the software from the information processing apparatus connected via the wired-connection interface unit.

14. The mobile terminal apparatus according to claim 11, wherein
    the software-source monitoring unit monitors the wireless-connection interface unit as the software source, and acquires the information pertaining to the software from the information processing apparatus connected via the wireless-connection interface unit.

15. A method of installing software in a mobile terminal apparatus connectable to a peripheral device, the method comprising:
    software-source monitoring including
        monitoring a software source that provides software required for using the peripheral device; and
        storing data pertaining to acquirable software and the software source in a corresponding manner in a memory unit;
    monitoring connection status of the peripheral device;
    selecting the software source based on the data stored in the memory unit when connection of the peripheral device is detected; and
    acquiring the software from the software source selected at the selecting.

* * * * *